United States Patent [19]

Groom

[11] 4,119,304

[45] Oct. 10, 1978

[54] APPARATUS FOR MIXING AND DISPENSING FAST SETTING PLASTIC MATERIAL INTO A MOLD

[75] Inventor: James S. Groom, Wales, Mass.

[73] Assignee: Package Machinery Company, East Longmeadow, Mass.

[21] Appl. No.: 762,044

[22] Filed: Jan. 24, 1977

Related U.S. Application Data

[63] Continuation of Ser. No. 596,389, Jul. 16, 1975, abandoned.

[51] Int. Cl.² .................. B01F 7/16; B01F 15/02; B29F 3/02
[52] U.S. Cl. .................. 366/189; 366/192; 425/130; 425/200; 425/561
[58] Field of Search .......... 425/200, 207, 209, 542, 425/130, 557, 558, 561; 164/21; 259/22, 23, 24, 41, 42, 43, 44; 264/329, 328; 222/229; 366/184, 189, 192

[56] References Cited

U.S. PATENT DOCUMENTS

| | | | |
|---|---|---|---|
| 3,695,575 | 10/1972 | Hauser | 425/207 X |
| 3,728,053 | 4/1973 | Stillhard et al. | 425/208 X |
| 3,975,128 | 8/1976 | Schluter | 425/207 |

FOREIGN PATENT DOCUMENTS

1,961,136  6/1971  Fed. Rep. of Germany .......... 264/329

Primary Examiner—Francis S. Husar
Assistant Examiner—William R. Briggs
Attorney, Agent, or Firm—McCormick, Paulding & Huber

[57] ABSTRACT

A mixing valve is located at the opening of a mold cavity to control the flow of a fast setting mixture into the mold and to mix the ingredients forming the mixture immediately prior to dispensing into the mold. The valve includes a plurality of mixing elements on a mixing head which rotates about its own axis within the valve housing and which cooperates with the housing to define a mixing chamber receiving the ingredients. When the valve is open, the plurality of mixing elements supported from the head in the mixing chamber are rotated with the head to mix the ingredients into the fast setting mixture. The head also reciprocates along its axis to open and close the valve and completely fills the chamber to eject the mixed ingredients when the valve is closed.

12 Claims, 3 Drawing Figures

APPARATUS FOR MIXING AND DISPENSING FAST SETTING PLASTIC MATERIAL INTO A MOLD

CROSS REFERENCE TO RELATED APPLICATION

This application is a continuation of application Ser. No. 596,389 filed on July 16, 1975 now abandoned.

BACKGROUND OF THE INVENTION

The present invention relates to the field of molding and is concerned, more particularly, with the molding of articles from fast setting plastics.

There are certain new types of fast setting plastics such as polyurethanes formed by mixing two or more ingredients which interreact and rapidly solidify. Because of the rapid setting characteristics of the plastic, the ingredients cannot be mixed and satisfactorily dispensed into a forming mold by conventional molding techniques. If any of the mixed ingredients remain in the mixing and dispensing head, then an immediate second attempt to expel the mixed ingredients may be required (which is not usually practical), or the head must be flushed immediately with a solvent which is a costly, messy, and toxic operation. Failing to do either of these operations allows the mixed ingredients to set up in the head which leads to shutdown of the molding machine and a costly cleaning operation.

Another problem associated with the fast setting plastics, is that the ingredients must be thoroughly mixed prior to the molding of the plastic in the desired final form. Complete mixing is necessary and must be done in proper proportions in order to allow the ingredients to interreact completely and thus produce the rapid setting plastic.

It will be understood that the two problems, that is forming the fast setting plastic in proper and final form before the plastic sets up and thoroughly mixing the ingredients forming the plastic, are somewhat antagonistic. Thorough mixing of the ingredients takes a finite time, but the time in which the mixed ingredients set up is short. Thus, the mixing apparatus must be particularly efficient in operation and located within a short distance of the mold or other object which determines the final shape and form of the plastic when set up.

Because of the above-described problems, the new fast setting plastics have not been used in conventional molding machines. Nevertheless, the rapid setting features of the plastics are desirable, and the adaption of a molding machine to such plastics is a worthwhile objective.

Accordingly, it is a general object of the present invention to provide both method and apparatus for utilizing rapid setting plastics in a molding machine. A more specific object of the present invention is to provide a mixing valve which rapidly mixes ingredients forming a fast setting plastic and then dispenses all of the mixed ingredients from the valve to keep the valve cleaned out.

SUMMARY OF THE INVENTION

The present invention resides in an apparatus and method or mixing and dispensing rapid setting plastics into a mold to form various articles such as tubes and other molded plastic items.

The apparatus which carries out the method is embodied in a molding machine and is comprised basically of a mixing valve positioned at the opening of a mold cavity. The valve controls the flow of molding ingredients and thoroughly mixes the ingredients before they pass into the mold cavity. The valve comprises means defining a housing surrounding the opening into the mold cavity and having at least one inlet port through which the ingredients are introduced into the housing. A mixer head is disposed in the housing for axial movement between a "valve open" position, where it defines a mixing chamber interconnecting the inlet port and the mold cavity, and a "valve closed" position, where it closes the inlet port through which the ingredients are introduced into the chamber and at the same time fills the chamber to eject all of the mixed ingredients from the chamber. The mixer head is rotatable on its axis at least during the period while the head is in its "valve open" position, and at least one mixer element is supported by the head to be positioned in the mixing chamber for rotation with the head. Thus, the rotation of the head mixes the ingredients introduced into the chamber during the "valve open" position of the head and all of the mixed ingredients are expelled from the mixing chamber when the head is in the "valve closed" position.

In the preferred embodiment of the invention, the head has a cylindrical form and the mixing elements are pins located off the axis of the head and rotate with the head about the head axis to mix the ingredients in the mixing chamber. Additionally, the cylindrical head reciprocates in a direction parallel to its axis to open and close the inlet ports through which the ingredients enter the mixing chamber.

Since the mixing head is moved into the "valve closed" position to empty all of the mixed ingredients from the chamber each time a charge of the mixture fills the cavity of the mold, the molding process is completed and an article is formed within the mold without having any of the fast setting mixture solidify in the mixing chamber of the valve. Thus, repeated mixing and dispensing operations can be carried out cyclically without difficulty and the resulting articles rapidly set up in the cavity of the molds.

DESCRIPTION OF THE PREFERRED EMBODIMENTS

Figure 1:
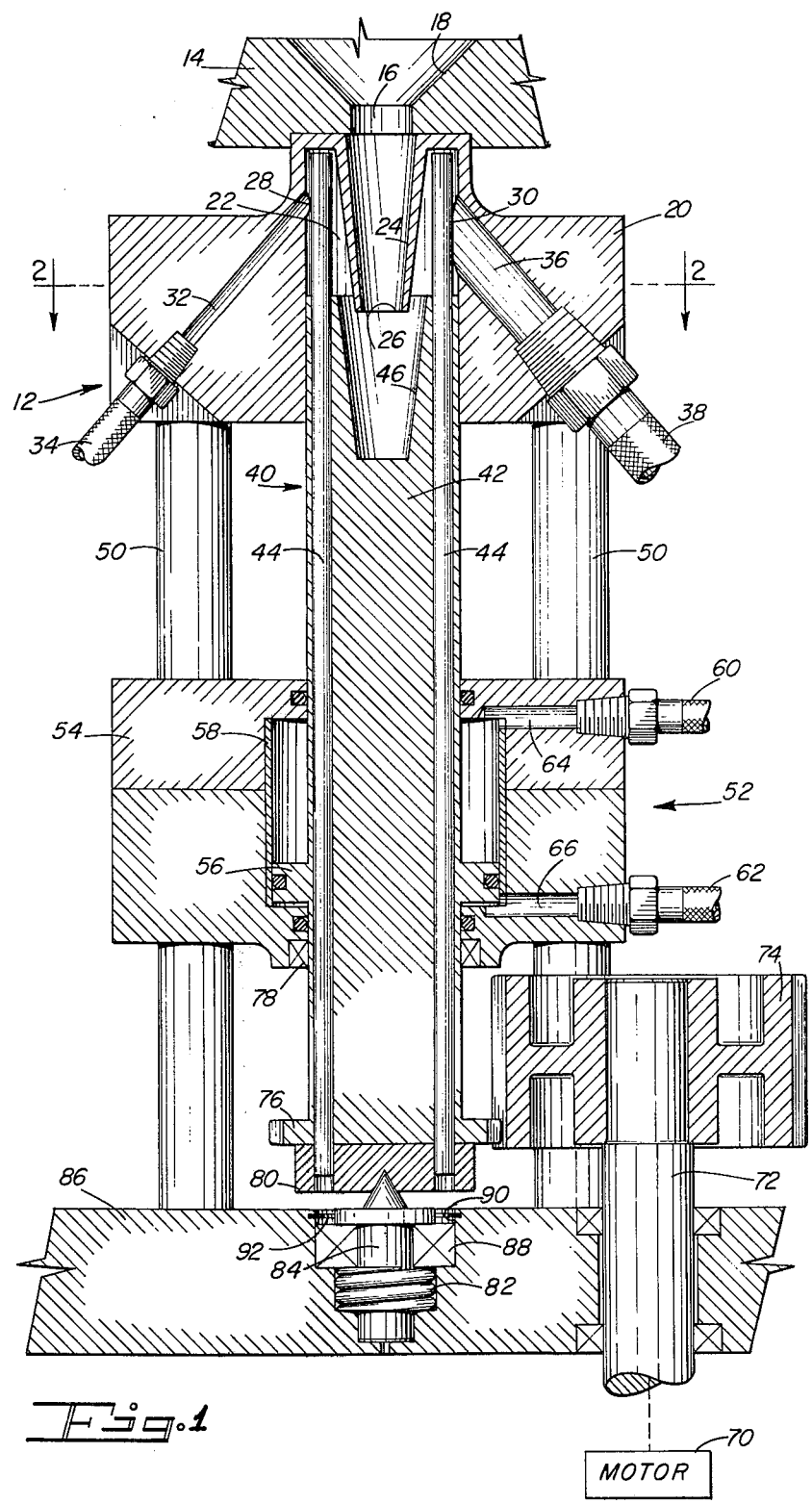
FIG. 1 is a sectional view of a valve for mixing and dispensing fast setting mixtures into a mold cavity and shows the valve in the open position.

FIG. 1 illustrates the apparatus, generally designated 10, of the present invention in one embodiment. The apparatus is comprised of a mixing valve 12 which is connected directly with a mold 14 at the opening 16 of the mold cavity 18. The valve 12 serves to dispense a fast setting material or mixture into the mold cavity and insures that the ingredients forming the mixture are thoroughly mixed immediately prior to being dispensed into the mold cavity.

The valve 12 has a housing 20 defining an internal mixing chamber 22 and the chamber has a cylindrical outer wall and a conical projection 24 extending coaxially of the wall into the chamber from the end portion of the housing which mates with the mold opening 16. The projection 24 is hollow and defines a tapered sprue passageway between an exit port 26 of the chamber 22 and the opening 16 leading to the mold cavity 18.

The mixing chamber 22 has two generally radially directed inlet ports 28 and 30 defined in the outer cylindrical wall for introducing into the chamber the molding ingredients which form the fast setting mixture. The port 28 is situated at the end of a passageway 32 that transmits at least one ingredient under pressure to the chamber from a supply conduit 34. In a similar manner, the port 30 is situated at the end of a passageway 36 which transmits an additional ingredient under pressure to the mixing chamber from a supply conduit 38. It should be understood that the passageways and conduits may supply one or more ingredients which ingredients by themselves do not rapidly set up, but which when mixed together within the chamber 22 form the fast setting mixture that is immediately dispensed by the valve 12 into the cavity 18 of the mold to form a desired article. Accordingly, it is necessary that the ingredients entering the mixing chamber be thoroughly mixed together before the ingredients leave the chamber through the exit port 26. Furthermore, each time the mold cavity 18 is filled with a charge of the mixture, the mixing chamber 12 must be completely emptied of all the mixed ingredients before they have an opportunity to set up and thus clog the chamber and jam the valve 12. If such should happen, the molding machine would not operate and a costly shutdown would be required to clean out the valve 12. Such a cleaning operation would require the valve to be removed from the molding machine, disassembled and cleaned by burning the plastic out. The residue would then be cleaned out and the valve would be re-assembled and re-installed in the molding machine.

Accordingly, the valve 12 is provided with a mixing head 40 which is comprised of a spindle 42 and a plurality of mixing pins 44 supported by the spindle. The spindle 42 has a generally cylindrical configuration complementary to the shape of the mixing chamber and is positioned coaxially with the cylindrical outer wall of the chamber 22 in alignment with the opening 16 of the cavity 18. The one end of the spindle also slides axially of itself in close fitting relationship with the cylindrical wall and cooperates with the wall and the projection 24 in defining the mixing chamber 22. The same end of the spindle has a recess 46 which mates precisely with the projection 24 when the spindle is shifted axially through the housing toward the mold 14 into the position illustrated in FIG. 3. One material especially suitable for the spindle 42 and the mixing pins 44 is an ultra-high molecular weight polyethylene which the fast-setting polyurethanes do not tend to adhere to.

Figure 2:
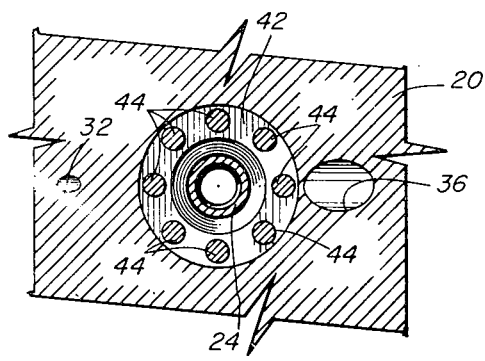
FIG. 2 is a sectional view of the mixing valve as viewed along the sectioning line 2—2 in FIG. 1.

The mixing pins 44 also have cylindrical cross sections, but may have other shapes, and are supported in sliding relationship within corresponding bores in the spindle. The pins are spaced radially outward of the axis of the spindle and the chamber 22 near the periphery of the spindle as indicated most clearly in FIG. 2. The number of pins 44 provided in the spindle may be varied depending upon the diameter of the spindle and the pins. By rotating the spindle 42 rapidly about its axis together with the mixing pins 44 when the spindle is in the position shown in FIG. 1, the ingredients introduced into the mixing chamber 22 are thoroughly intermingled and mixed together before they pass from the exit port 26 through the sprue passageway in the projection 24 into the cavity 18 of the mold 14.

It will be noted that the passageways 32 and 36 have different diameters for carrying the ingredients which form the fast setting material in measured proportions, and the passageways extend radially inwardly toward the axis of the spindle at the inlet ports 28 and 30. When the spindle is in its retracted position shown in FIG. 1, the inlet ports 28 and 30 are open and in communication with the exit port 26 through the remainder of the mixing chamber 22. Thus, the ingredients pumped through the conduits 34 and 38 pass through the passageways 32 and 36, the chamber 22 and the sprue passageway within the projection 24 into the cavity 18 of the mold 14. Conversely, the spindle completely covers the inlet ports 28 and 30 when it is in the extended or closed position shown in FIG. 3 and shuts off the flow of ingredients into the chamber and the flow of material into the mold. Accordingly, the mixing valve 12 has a "valve open" position when the spindle 42 is in the position illustrated in FIG. 1 and a "valve closed" position when the spindle is in the position shown in FIG. 3.

Figure 3:
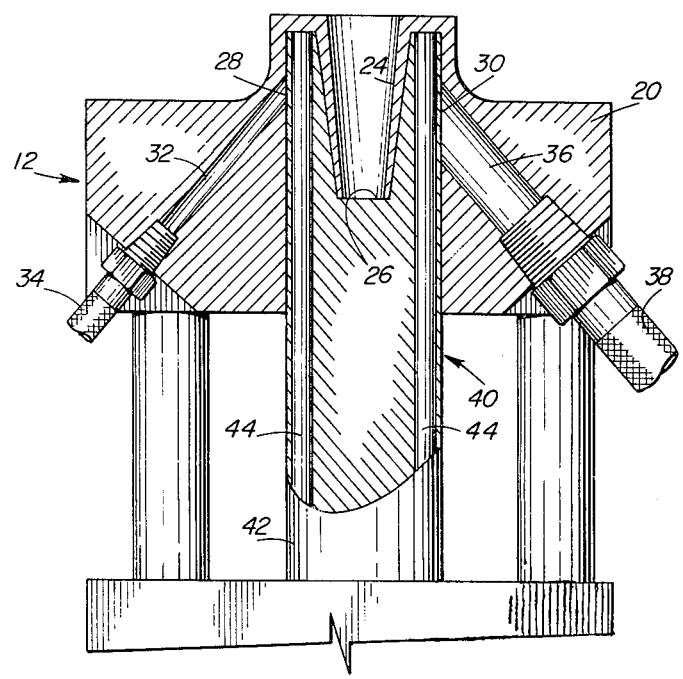
FIG. 3 is a fragmentary cross-sectional view of the mixing valve in FIG. 1 and shows the valve in the closed position.

It will be observed that because of the mating configurations of the spindle 42, the projection 24 and the cylindrical outer wall of the chamber 22, the chamber is completely filled by the spindle and mixing pins 44 when the head 40 is in the "valve closed" position shown in FIG. 3. Thus, all of the ingredients are expelled or ejected from the chamber into the sprue passageway in the projection 24 and the mold cavity 18 when the head 40 is placed in the "valve closed" position. None of the fast setting mixture formed by the ingredients remains in the chamber and hence the mixing valve does not become blocked or clogged by the fast setting mixture. The materials within the passageways 32 and 36 are also shut off by the spindle 42 and remain in a non-setting condition so that they can subsequently flow into the mixing chamber and produce additional fast setting mixtures when an empty mold is again located in communication with the exit port 26 of the chamber and the mixing valve 12 is opened. It will be noted that the sprue passageway within the projection 24 may contain fast setting material after the valve is closed. Such material at this location merely sets up with the material in the mold 14 and is withdrawn as part of the article formed by the mold when the article is removed from the cavity 18. The tapered configuration of the sprue passageway insures that the material within the projection is removed with the rest of the molded article after the fast setting mixture has set up.

The mechanism which controls the operation of the mixing valve 12 is supported in spaced relationship from the valve housing 20 on a plurality of columns 50 circumaxially disposed about the spindle 42. The mechanism which causes the spindle 42 to reciprocate within the chamber 22 relative to the housing 20 to thereby open and close the mixing valve is illustrated as a hydraulic actuator 52. The actuator has a two-pieced cylinder assembly 54 and a piston 56 integrally formed on the spindle 42. A liner or sleeve 58 is situated within the cylinder assembly and the piston 56 slides in sealing relationship within the sleeve. Hydraulic fluid is delivered to one side or the other of the piston through hydraulic lines 60 and 62 and fluid passageways 64 and 66.

The mechanism for rotating the spindle 42 relative to the housing 20 and the cylinder assembly 54 in a bearing 78 is comprised of a drive motor 70 which may be an electric or hydraulic motor coupled to the end of the spindle opposite the valve 12 by means of a drive shaft 72 and a set of drive gears 74 and 76. The gear 76 is integrally formed or otherwise rigidly connected to the end of the spindle opposite the valve and in FIG. 1 engages the one end of the gear 74. The gear 74 has an axial dimension or thickness equal to or slightly larger than the stroke of the spindle so that when the spindle is in its extended, retracted or any intermediate position, the teeth on the gears 74 and 76 remain in engagement. Thus, there is no engagement or disengagement of the gear teeth when the spindle reciprocates under the control of the hydraulic actuator 52.

The mixing pins 44 slide freely within the spindle 42 so that the ends of the pins can remain within the mixing chamber 22 during the mixing step of the molding process, when the spindle is in the retracted position illustrated in FIG. 1. In order to keep the ends of the pins in the mixing chamber, each of the pins is soldered, welded, swagged, or otherwise fixedly connected to a thrust plate 80 at the end of the spindle opposite the valve 12, and the plate is biased toward the valve by means of a coil spring 82 and a rotatably mounted centering pin 84. The centering pin 84 has a conical end which fits within a mating recess in the thrust plate 80 and is rotatably mounted in a portion of the machine frame 86 by means of a thrust bearing 88. The pin 84 is secured to the one race of the bearing 88 while the coil spring 82 operates against the other race. The bearing fits in sliding relationship within a recess 90 in the frame 86 and a snap ring 92 insures that the bearing 88 remains within the recess 90.

It will be noted that when the spindle 42 is in its retracted position, as shown in FIG. 1, the gear 76 on the one end of the spindle contacts the thrust plate 80 and lifts the plate and mixing pins 44 so that there is a finite clearance between the ends of the pins in the mixing chamber 22 and the end portion of the housing 20 abutting the mold 14. The lifting of the pins is accomplished by the hydraulic actuator 52 and the spindle 42 in opposition to the biasing force of the coil spring 82. Therefore, when the hydraulic actuator 52 extends the spindle 42 and the spindle reaches the closed position of the valve 12 as shown in FIG. 3, the biasing force applied by the spring 82 to the thrust plate 80 causes the mixing pins 44 to "bottom" against the end portion of the mixing chamber and displace any of the mixed ingredients from the end faces of the pins.

In a typical molding process, the mixing valve 12 is operated by the hydraulic actuator 52 and the drive motor 70 in the following manner. At the beginning of the process, the drive motor 70 is inoperative and the spindle 42 is in the extended position shown in FIG. 3 to close the valve by covering the inlet ports 28 and 30. The mold cavity including the sprue passageway within the projection 24 is empty. Hydraulic fluid enters the conduit 60 and moves the spindle 42 to the retracted position illustrated in FIG. 1. The ingredients for forming the fast setting material are supplied through the conduits 34 38 under pressure and enter the mixing chamber 22. At the same time, the drive motor 70 is started and rapidly rotates the spindle 42 together with the mixing pins 44 so that the ingredients within the chamber become thoroughly mixed before they reach the exit port 26. Preferably, the operation of the drive motor 72 is initiated by a limit switch contacted by the spindle 42 when it reaches its retracted position.

It will be noted that the inlet ports 28 and 30 are directed generally radially inward of the mixing chamber at a point where the chamber has a generally annular configuration formed by the projection 24 and the outer cylindrical walls of the chamber. Furthermore, the mixing pins revolve about the axis of the spindle within the annular portion of the chamber so that both the pressure forcing the ingredients into the chamber and the rotation of the pins within the annular portion contribute to the mixing of the ingredients before they overflow the projection and pass from the exit port 26 through the sprue passageway into the opening of the mold. In one embodiment of the invention, the mixing chamber 22 has a volume which is substantially less than that of the cavity in the mold being filled so that the introduction of the ingredients into the mixing chamber and the discharging of the ingredients into the cavity take place simultaneously with the spindle in the open position. During this time, the pressures in the supply conduits 34 and 38 force the fast setting mixture from the chamber 22 and into the mold 14 in proportions set by metering in the conduits 34 and 38.

When the appropriate charge of fast setting material has been injected into the mold 14, the spindle 42 is extended to the position shown in FIG. 3 by hydraulic fluid entering the actuator 52 throough the conduit 62. The triggering of the spindle extention may be initiated by a timer or other mechanism metering a single charge of ingredients through the supply conduits 34 and 38. The spindle rotation is also stopped at the same time.

With the spindle in its extended position shown in FIG. 3, the inlet ports 28 and 30 are blocked to stop the flow of ingredients into the mixing chamber and the mixing head 40 comprised by the spindle 42 and the pins 44 completely fills the chamber to eject any residual material from the chamber through the exit port 26 and into the sprue passageway or the mold cavity 18. Thus, the chamber is completely emptied of any mixed ingredients which would otherwise set up and interfere with subsequent molding operations.

The molded article then sets up rapidly and is removed from the mold 14 to permit the molding process to be repeated.

While the present invention has been described in a preferred embodiment, it will be understood that numerous modifications and substitutions can be made without departing from the spirit of the invention. For example, although the spindle 42 is shown as a solid one-piece spindle with an integral piston 56 and gear 76, it is more likely that the spindle would be comprised of several separate parts. It is also not essential that the mixing pins 44 extend axially through the spindle from one end to the other since means for biasing the pins into the mixing chamber may be mounted in the spindle itself.

The actuating means for reciprocating the spindle in and out of the mixing chamber may be a pneumatic or mechanical actuating means rather than the hydraulic actuator 52 illustrated. The drive motor 70 and the gears 74 and 76 which serve as a means for rotating the spindle and the mixing pins may be varied in form and positioning relative to the actuating means which reciprocates the spindle. It is contemplated that more inlet ports may be provided to mix additional ingredients in the chamber 22 and also that a single inlet port may be provided through which one or more ingredients are separately or simultaneously injected for mixing prior to dispensing into the mold 14. While it is not contemplated that the spindle serve as an injection ram, such function may be performed by the spindle. The spindle may be driven rotatably about its axis continuously throughout the molding process if desired; however, the stop-and-start operation described above is preferred. Accordingly, the present invention is described in a preferred embodiment by way of illustration rather than limitation.

I claim:

1. A valve positionable at the opening to a mold cavity to control the flow of and to mix fast setting molding ingredients and comprising housing means defining a mixing chamber having an exit connectable with a mold opening and having two ingredient inlet ports, a mixer head disposed in the housing and including a spindle having a configuration complementary to the shape of the mixing chamber, the spindle being axially movable through the chamber of said housing between a "valve open" position wherein the spindle is withdrawn from the chamber and exposes said ports to admit fast setting ingredients to be mixed individually into the chamber and a "valve closed" position wherein the spindle closes said ports and fills said chamber to eject all ingredients from the chamber, the spindle having a central axis and an outer portion which is rotatably symmetric about the central axis and rotatable on the axis in at least the "valve open" position, at least one mixer element in the head supported by the spindle for rotation in the chamber to thereby effect mixing of the individually admitted ingredients in the "valve open" position and being movably mounted in the spindle to allow the mixing chamber to be filled by the head in the valve closed position, means connected with the spindle for reciprocating the spindle along its axis between the "valve open" and "valve closed" positions, and additional means connected with the mixer head for rotating the spindle about its axis together with the mixer element.

2. The valve construction of claim 1 wherein the said spindle is cylindrical and is axially aligned with the mold opening and there are a plurality of the said mixer elements provided, each of which elements comprises a pin supported by the spindle parallel to the spindle axis and spaced radially outwardly therefrom for sliding movement relative to the spindle.

3. The valve structure of claim 2 wherein the ports are disposed in the said housing with their axes directed generally radially to the spindle axis.

4. The valve structure as defined in claim 1 wherein each of the inlet ports is provided for the introduction of at least one molding ingredient and is disposed in said housing generally radially directed toward the axis of the mold opening and wherein the said spindle is cylindrical and axially aligned with the mold opening and in its "valve open" position is positioned to provide communication between said chamber and said ports.

5. The construction of claim 4 wherein there are a plurality of said mixer elements, each of which comprises a pin supported by the spindle parallel to its axis and spaced radially therefrom for sliding movement in the head.

6. A valve positionable at a sprue leading to a mold cavity to control the flow of and to mix fast setting molding ingredients and comprising means defining a housing having an exit port connectable with a sprue and having inlet ports with their axes disposed generally radially to the exit port axis, a mixer head disposed in said housing in axial alignment with said exit port and being shaped in complementary fashion with the housing for axial movement within the housing between an open position wherein the head cooperates with the housing to define an open mixing chamber between the inlet ports, the head and the exit port, and a closed position wherein the head substantially fills the chamber, closes the inlet ports and ejects all ingredients from the chamber through the exit port, the outer portion of the mixer head being rotationally symmetric with an axis aligned with the exit port and rotatable on the axis in at least the open position, at least one mixer element supported in said head for positioning in said chamber in the open position of the head and for rotation with the head to thereby effect mixing of the ingredients in the chamber in the open position, and being cooperatively mounted within the mixing head and chamber to permit the inlet ports to be closed and the mixing chamber to be filled in the closed position of the head, rotary means connected with the head for rotating the head on its axis, and means also connected with the head for reciprocating the head between the open and closed positions.

7. The valve as defined in claim 6 wherein there are a plurality of the said mixer elements, each of which comprises a pin supported in the head parallel to its axis and radially outwardly therefrom for sliding movement in the head.

8. The structure of claim 7 wherein in the closed position, the head and its supported pins engage the portion of the housing surrounding the exit port to eject ingredients completely from the chamber and in the open position the pins are spaced from said portion of the housing, and the remaining portion of the head is spaced farther from said portion of the housing than the pins to define said chamber.

9. The valve as defined in claim 6 wherein:
the mixing head comprises a spindle rotatable about its own axis and reciprocable along its axis relative to the housing means, and
a plurality of the mixing elements are supported in the spindle about the spindle axis, each element being mounted to slide in and out of the spindle parallel with the spindle axis whereby the elements may remain in the chamber in the open position of the head.

10. The valve as defined in claim 9 further including means connected with the housing for holding the mixing elements in the chamber when the spindle is in the open position.

11. The valve of claim 10 wherein:
the mixing elements extends axially through the spindle from one end cooperating to define the chamber to an opposite end; and
the means for holding includes resilient means operatively connected with the mixing elements at said opposite end of the spindle for biasing the mixing elements into the chamber when the spindle is in the open position.

12. The valve as defined in claim 9 wherein the spindle is comprised of an ultra-high molecular weight polyethylene.

* * * * *